UNITED STATES PATENT OFFICE.

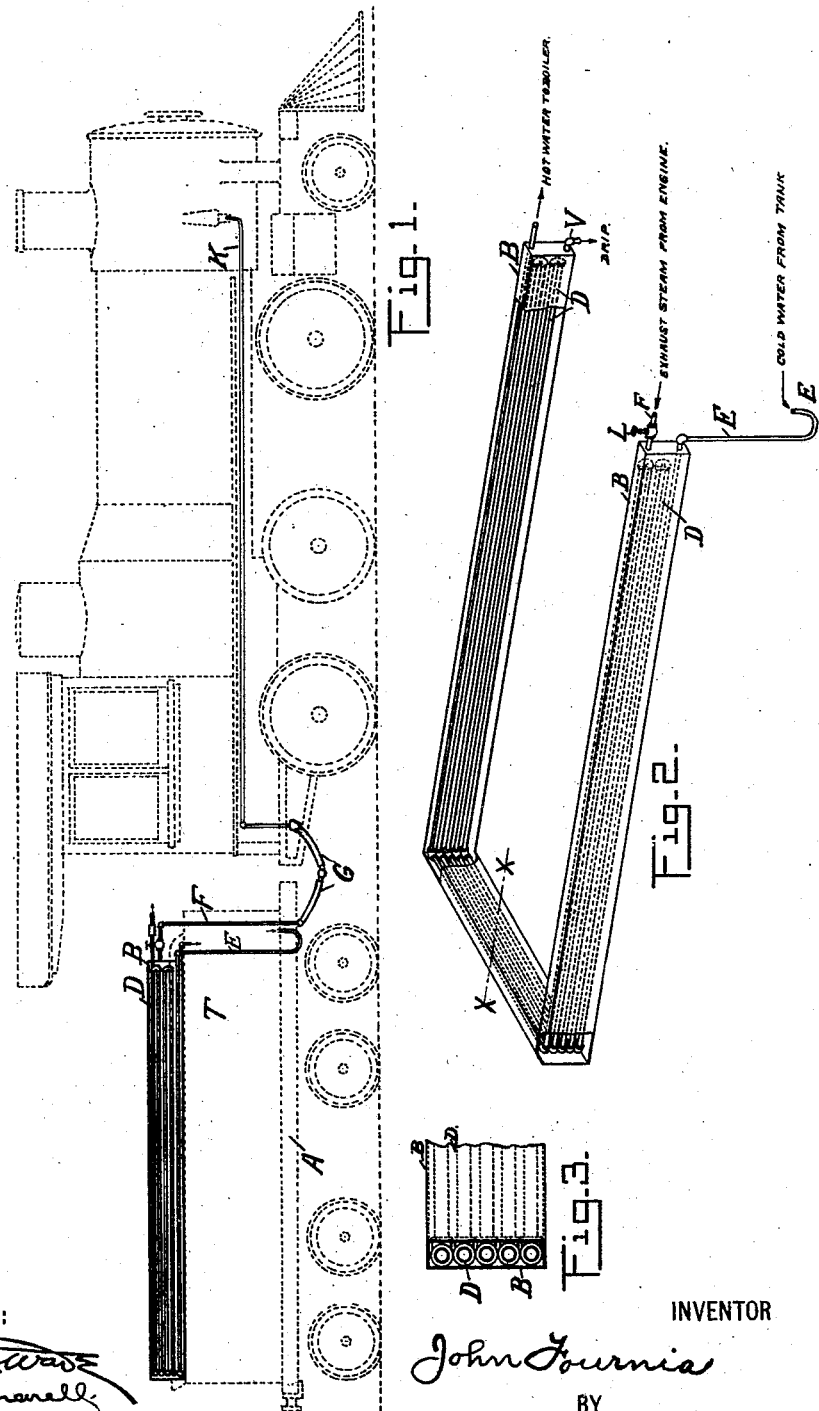

JOHN FOURNIA, OF ALBANY, NEW YORK, ASSIGNOR OF ONE-HALF TO FREDERICK R. GREENE, OF ALBANY, NEW YORK.

MEANS FOR HEATING FEED-WATER.

No. 842,777.　　　　　Specification of Letters Patent.　　　　　Patented Jan. 29, 1907.

Application filed May 2, 1906. Serial No. 314,745.

*To all whom it may concern:*

Be it known that I, JOHN FOURNIA, a citizen of the United States, residing at Albany, in the county of Albany and State of New York, have invented certain new and useful Improvements in Means for Heating the Feed-Water of Boilers, of which the following is a specification.

My invention relates to means for heating the feed-water before it is delivered to a boiler, whereby is obviated the retarding effect due to the chill which ensues when water is delivered cold; and the objects of my invention are, first, to provide a means for heating the feed-water before delivering the same to the boiler; second, to utilize the exhaust-steam from a locomotive for heating the feed-water. I accomplish these objects by means of the mechanism illustrated in the accompanying drawings, in which—

Figure 1 is a side elevation of a locomotive and tender provided with my invention. Fig. 2 is a perspective view of that portion of my invention applied to the tender. Fig. 3 is a transverse section along the lines X X in Fig. 2.

Similar letters refer to similar parts throughout the several views.

It is a well-known fact that the generation of steam in a boiler is retarded by the influx of cold water, and various means have heretofore been employed for warming the feed-water of a boiler. None, however, with which I am familiar has provided for causing the water to flow through a considerable length of pipe, with which pipe steam of a high temperature is brought in contact throughout its length.

When a coil of pipe is placed in a tank and means provided for circulating steam through the coil, the water does not come in contact with the heated coil uniformly, and when a pump is operated, forcing the water from the tank into the boiler, the water passes quickly from inlet to outlet of the tank containing the coil without deriving much benefit from the heat of the coil. I have provided a coil for the water and bring in contact with this coil the steam, whereby the water must necessarily flow throughout the whole length of the pipe, and thereby derive all the heat that is transmitted by the steam to the coil of pipe before the water is transmitted to the boiler.

I propose to use the exhaust-steam from the locomotive for obvious reasons. The steam immediately upon accomplishing the work provided for it in the locomotive still retains considerable momentum and a very high temperature. I conduct the steam preferably along the right side of the engine, forward of the boiler, taking it from immediately above the saddle in the smoke-box and convey it by means of the pipe K to the box B, arranged with coils of pipe D on the tender A, as hereinafter more specifically set forth.

Referring to the drawings, on the tank T on the tender A, I place a box B, preferably extending along each side of the tank and across the rear end of the tank. The box B is preferably arranged a short distance from the edge sufficient to allow an opening to take water out of the tank from the whole length of the tank on both sides. The water from the tank T on the tender enters the coil D through the pipe E at the bottom of the tank. The coil D is placed in the box B, extending along both sides and across the tank on the tender, as shown in Figs. 2 and 3. The lower portion of the coil is connected by the pipe E to the bottom of the tank on the tender, as aforesaid. The upper layer of the coil on the opposite side from the entrance of the water thereto is connected to a pump (not shown) on the engine. The box B, containing the pipe D, is connected by means of the pipe F and steam-couplings G to the pipe K to the engine forward of the boiler. The exhaust-steam leaves the box B to atmosphere through the outlet V. I preferably place a valve L in the pipe F for the purpose of regulating or shutting off the entrance of steam to the box B.

What I claim as my invention, and desire to secure by Letters Patent, is—

In a feed-water heater for locomotives, the combination of a locomotive and its tender, with a tank on said tender; a box placed along each side and across the rear end of said tank, spaced a short distance from the edge thereof, leaving an opening through which water may be taken from the tank; a coil placed in said box extending throughout its whole extent; a pipe connecting the lower layer of the coil with the bottom of the tank; a means for connecting the upper layer of the coil with the locomotive-boiler; a steam-conveying pipe connecting the interior of said box to the engine forward of the boiler; a valve in said steam-pipe, substantially as described.

In testimony whereof I have affixed my signature in presence of two witnesses.

JOHN FOURNIA.

Witnesses:
    FREDERICK W. CAMERON,
    LOTTIE PRIOR.